(12) United States Patent
Dragojevic et al.

(10) Patent No.: US 11,403,214 B2
(45) Date of Patent: Aug. 2, 2022

(54) MEMORY MANAGEMENT IN NON-VOLATILE MEMORY

(71) Applicant: Microsoft Technology Licensing, LLC, Redmond, WA (US)

(72) Inventors: Aleksandar Dragojevic, Cambridge (GB); Tudor Alexandru David, Vaud (CH)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/138,390

(22) Filed: Dec. 30, 2020

(65) Prior Publication Data

US 2021/0124678 A1 Apr. 29, 2021

Related U.S. Application Data

(62) Division of application No. 15/638,164, filed on Jun. 29, 2017, now Pat. No. 10,891,221.

(30) Foreign Application Priority Data

Jun. 15, 2017 (GB) ...................................... 1709499

(51) Int. Cl.
*G06F 12/02* (2006.01)
*G06F 11/14* (2006.01)
(Continued)

(52) U.S. Cl.
CPC ...... *G06F 12/0238* (2013.01); *G06F 11/1435* (2013.01); *G06F 12/0246* (2013.01);
(Continued)

(58) Field of Classification Search
CPC ............ G06F 12/0238; G06F 12/0246; G06F 12/0868; G06F 11/1435; G06F 11/1441;
(Continued)

(56) References Cited

U.S. PATENT DOCUMENTS

| | | | | |
|---|---|---|---|---|
| 6,732,124 B1* | 5/2004 | Koseki | ............... | G06F 11/1435 711/119 |
| 9,020,987 B1* | 4/2015 | Nanda | ................. | G06F 16/1734 707/821 |

(Continued)

FOREIGN PATENT DOCUMENTS

| | | |
|---|---|---|
| CN | 108959129 B | 8/2021 |
| EP | 3170087 A1 | 5/2017 |
| EP | 3663927 A1 | 6/2020 |

OTHER PUBLICATIONS

Haris Volos, Mnemosyne: Lightweight Persistent Memory, ASPLOS, Mar. 2011 (Year: 2011).*

(Continued)

*Primary Examiner* — Ryan Bertram

(57) ABSTRACT

A method for allocating memory in a computing device having a non-volatile main memory is described. The method comprises receiving, by a memory allocator, a request for non-volatile memory allocation of an object from a program executing on the computing device, the request comprising a requested memory size and registration data from the program. The method comprises finding an available address of one of a plurality of portions of a page of the non-volatile memory and searching an active page table in the non-volatile main memory to find the page and if the page is not found in the active page table: inserting the page into the active page table; and waiting for a memory write for inserting the page into the active page table to complete.

20 Claims, 6 Drawing Sheets

(51) Int. Cl.
  *G06F 9/50* (2006.01)
  *G06F 12/0868* (2016.01)
(52) U.S. Cl.
  CPC ........ *G06F 9/5016* (2013.01); *G06F 11/1441* (2013.01); *G06F 11/1479* (2013.01); *G06F 12/0868* (2013.01); *G06F 2212/7202* (2013.01); *G06F 2212/7203* (2013.01); *G06F 2212/7205* (2013.01); *G06F 2212/7207* (2013.01)
(58) Field of Classification Search
  CPC ......... G06F 11/1479; G06F 2212/7202; G06F 2212/7203; G06F 2212/7205; G06F 2212/7207; G06F 9/5016
  See application file for complete search history.

(56) References Cited

U.S. PATENT DOCUMENTS

| | | | | |
|---|---|---|---|---|
| 9,152,353 | B1* | 10/2015 | Wang | G06F 11/1435 |
| 2009/0158085 | A1* | 6/2009 | Kern | G06F 11/1064 |
| | | | | 711/E12.091 |
| 2013/0067192 | A1* | 3/2013 | Yaari | G06F 12/0292 |
| | | | | 711/202 |
| 2015/0355981 | A1* | 12/2015 | Booss | G06F 16/24561 |
| | | | | 707/674 |
| 2018/0018218 | A1* | 1/2018 | Rat | G06F 11/08 |
| 2018/0046556 | A1* | 2/2018 | Marathe | G06F 11/1474 |
| 2020/0159621 | A1* | 5/2020 | Velayuthaperumal | |
| | | | | G06F 3/064 |

OTHER PUBLICATIONS

Kumud Bhandari, Makalu: Fast Recoverable Allocation of Non-volatile Memory, OOPSLA, Nov. 2016 (Year: 2016).*

"Search Report and Written Opinion Issued in Luxembourg Application No. LU102287", dated Aug. 27, 2021, 10 Pages.

"Office Action Issued in European Patent Application No. 18731271.5", dated Nov. 8, 2021, 14 Pages.

"International Search Report and Written Opinion Issued in PCT Application No. PCT/US21/072705", dated Feb. 24, 2022, 12 Pages.

"Notice of Allowance Issued in European Patent Application No. 18731271.5", dated Apr. 21, 2022, 7 Pages.

* cited by examiner

MEMORY MANAGEMENT IN NON-VOLATILE MEMORY

CROSS-REFERENCE TO RELATED APPLICATIONS

This application is a divisional application of and claims priority to U.S. patent application Ser. No. 15/638,164, entitled "MEMORY MANAGEMENT IN NON-VOLATILE MEMORY," filed on Jun. 29, 2017 which claims priority to GB application serial number 1709499.6, filed Jun. 15, 2017, the entireties of which are hereby incorporated by reference herein.

BACKGROUND

Memory management techniques are used by user mode memory allocators to dynamically allocate portions of memory to programs at their request, and deallocate (or "free") the memory portions for reuse when they are no longer needed.

Main memory of computing devices is going to be non-volatile in future machines, which means that program data stored in it will not be lost on power failures. However, data stored in volatile memory will be lost on power failures. Some parts of main memory will be volatile. All updates to main memory are performed through central processing unit (CPU) caches, which are volatile. In the event of a power failure, data structures in non-volatile memory could be left in an inconsistent state if data is changed in a cache, but the data changed in the cache is not written back to the non-volatile memory before a power failure.

Memory allocators can suffer from such data inconsistency due to power failures. If there is a power failure before data in a volatile memory, such as a CPU cache, is written to a non-volatile memory, program data might be in an inconsistent state after the power comes back. The memory occupied by an object could be marked allocated in allocator metadata stored in a cache, but the object may not yet be linked in program data structures, which means the memory is permanently leaked and will not be used in the future. Alternatively, a portion of non-volatile memory may be allocated for an object, but the memory allocator state in the non-volatile memory is not updated, which means that the memory could be allocated for a different object in the future, leading to memory corruption. A similar problem can occur when a program frees a previously allocated object and removes a pointer to it. If there is a power failure that prevents all the updates from reaching main memory, the object could either be leaked or memory could be allocated twice, leading to memory corruption.

To prevent such scenarios, CPUs support instructions to write back ("flush") cache lines from a CPU cache to non-volatile memory. For instance, Intel (trade mark) supports the clwb instruction that guarantees that the target cache line is stored in main memory at the next memory store fence. The store fence acts as a "wait" for the data to reach memory to prevent power failures from causing memory allocator state (and other data) inconsistencies in non-volatile memory.

Non-volatile user mode memory allocators use allocation logs to facilitate recovery of allocator states after power failures. They rely on logging allocator states in the allocation logs in non-volatile memory and using the allocation logs for recovery after failures.

Waiting for writes to memory to complete during memory allocation and deallocation degrades performance of the program as such waiting typically takes hundreds of cycles on modern CPUs.

The embodiments described below are not limited to implementations which solve any or all of the disadvantages of known user mode memory allocators.

SUMMARY

The following presents a simplified summary of the disclosure in order to provide a basic understanding to the reader. This summary is not intended to identify key features or essential features of the claimed subject matter nor is it intended to be used to limit the scope of the claimed subject matter. Its sole purpose is to present a selection of concepts disclosed herein in a simplified form as a prelude to the more detailed description that is presented later.

A method for allocating memory in a computing device having a non-volatile main memory is described. The method comprises receiving, by a memory allocator, a request for non-volatile memory allocation of an object from a program executing on the computing device, the request comprising a requested memory size and registration data from the program. The method comprises finding an available address of one of a plurality of portions of a page of the non-volatile memory and searching an active page table in the non-volatile main memory to find the page and if the page is not found in the active page table: inserting the page into the active page table; and waiting for a memory write for inserting the page into the active page table to complete.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

Figure 1:
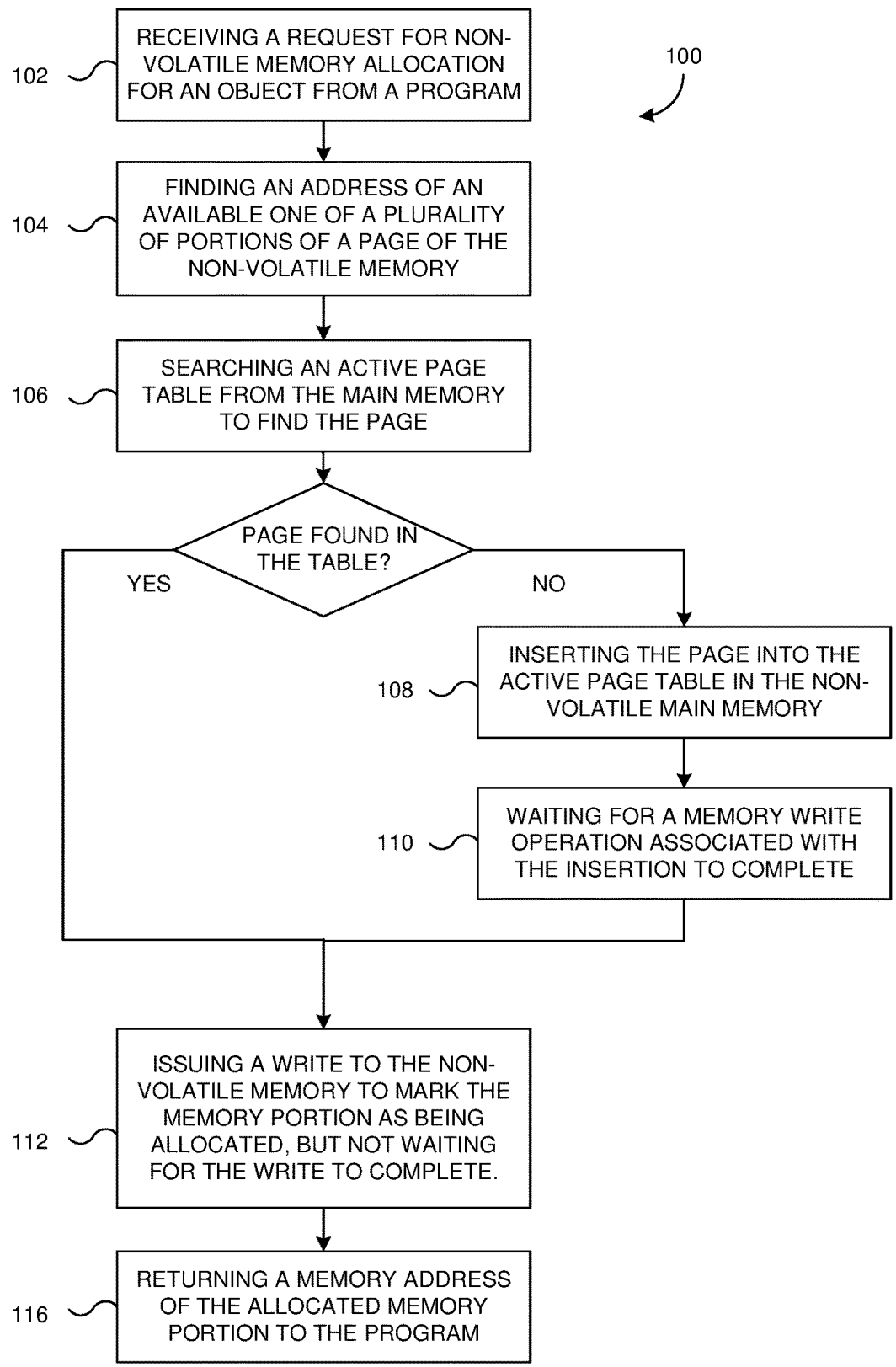
FIG. 1 is a flow diagram of a method for allocating a portion of memory according to a first embodiment.

The detailed description provided below in connection with the appended drawings is intended as a description of the present examples and is not intended to represent the only forms in which the present example are constructed or utilized. The description sets forth the functions of the example and the sequence of operations for constructing and operating the example. However, the same or equivalent functions and sequences may be accomplished by different examples.

A typical approach for using an allocation log in user mode memory allocation and deallocation in single-thread programs is described below.

1. The memory allocator finds an available address for a portion of a non-volatile memory for allocation, and logs the address to the allocation log.

2. The allocator updates allocator metadata stored in non-volatile memory to mark the object as being allocated.

3. The memory allocator writes a value of the object to the allocated object.

4. The memory allocator stores the object address to a pointer.

5. The memory allocator logs the allocation as being completed by writing to the non-volatile memory.

To enable recovery, the allocator writes log, allocator metadata, object contents, and pointer to the non-volatile memory. It has to wait for the writes (e.g. using club and a store fence on Intel's (trade mark) CPUs) to reach the non-volatile memory after steps 1 and 5. This allows the recovery code that runs after a power failure to recover the state of the allocator. After a power failure, the recovery code examines the log, and rolls back the allocation for each entry in the log that was not marked as completed.

Similar steps and waiting for writes to memory are required for memory deallocations, which also require two memory write operations per deallocation.

According to various embodiments, a user mode memory allocator divides a non-volatile memory into memory "pages", i.e. blocks of memories. Portions of memory on a page may be allocated to objects of the same size. In addition, a plurality of pages may also be allocated to objects of the same size. For instance, a memory allocator may allocate pages of 2 kB to objects of 32-byte and may allocate pages of 64 kB to objects of 1 kB.

The allocator may keep the following pieces of meta-data in non-volatile memory: a table ("full page table") of all pages it has used for allocation or will use for potential allocation, an active page table of pages that may require recovery in case of a power failure, and meta-data for each page that contains information about whether each potential memory portion in the respective page is allocated or free. The active page table may maintain a subset of the pages of the full page table. Recent updates to the allocator metadata is first kept in volatile CPU caches before being written into the non-volatile memory. In the event of a power failure, the recent updates to the allocator metadata may be lost in the cache before being written into the non-volatile memory.

An "active page table" is a table of a selection of memory pages ("active pages"), the information of which may need recovery in event of a power failure. The active page table may contain addresses of the pages which need recovery. The active page table is kept in the non-volatile main memory. The active page table may keep memory pages which have portions of memory recently allocated or freed. The metadata of the pages in the active page table is stored in the non-volatile memory. The metadata of the pages may include any information associated with the pages. However, recent updates to the metadata of the pages in the active page table may temporarily be stored in a non-volatile memory, such as a cache, as described above. The recent updates to the metadata will be lost in the event of a power failure. The metadata of the active pages can be recovered using program-specific recovery procedures as will be described below.

According to various embodiments, there is provided a method for allocating memory in a computing device. According to the method, a memory allocator, receives a request for non-volatile memory allocation of an object from a program executing on the computing device. The request comprises a requested memory size and registration data from the program. In response to the request, the memory allocator finds an available address of a portion of a page of the non-volatile memory. The memory allocator then searches an active page table in the non-volatile main memory to find the page and if the page is not found in the active page table, it inserts the page into the active page table; and waits for a memory write for inserting the page into the active page table to complete before carrying out any further processing. Then the memory allocator may update the metadata of the page to indicate that the object has been allocated with a memory portion, wherein update to the metadata of the page is first stored in a volatile memory, such as a cache, before being written into the non-volatile main memory. The memory allocator then issues a write to the non-volatile main memory to update the metadata of the page in the non-volatile main memory for marking the memory portion as being allocated to the object, but does not wait for the write to complete before carrying out further processing.

According to various embodiments, there is also provided a method for deallocating memory in a computing device having a non-volatile main memory. The method comprises receiving a request from a program executing at the computing device for deallocating a portion of the non-volatile main memory allocated to an object; finding, a page containing the memory portion; searching an active page table in the non-volatile main memory to find the page, and if the page is not found in the active page table: inserting the page into the active page table; and waiting for a memory write for inserting the page into the active page table to complete. The program may then perform unlinking of the object at the portion of memory from its data structures. The method for deallocating memory may further comprise updating metadata of the page to indicate the object as free, wherein update to the metadata is first stored in a volatile memory before being written into the non-volatile memory. The method further comprises issuing a write to the non-volatile main memory to update the metadata of the page in the non-volatile main memory for marking the memory portion as being deallocated, but not waiting for the write to complete before carrying out further processing. The write from the volatile memory to the non-volatile main memory may be implemented using the club instruction.

According to the memory allocation or deallocation method of the various embodiments, waiting for writes to memory is only needed in the event that the memory page used by the memory allocation or deallocation is not currently in the active page table. To improve locality of access and efficiency, the memory allocator may allocate memory from recently used pages.

According to various embodiments, there is also provided a method for data recovery in a computing device having a non-volatile main memory and a volatile memory, the method comprising: i) receiving, from a program, a request for recovering metadata of pages in an active page table, ii) identifying a memory page in a plurality of memory pages in the active page table, iii) identifying a memory portion in a plurality of memory portions in the memory page, iv)

accessing registration data stored in the non-volatile main memory to invoke a recovery function for the program, v) producing, by the recovery function, a result indicating whether the memory portion has been allocated to an object or has been freed, and vi) marking, by the recovery function, the metadata of the page in the non-volatile memory to indicate whether the memory portion has been allocated to the object or has been freed using the result. The method for data recovery may further comprise vii) repeating processes iv)-vi) for each remaining memory portion in the plurality of memory portions of the memory page, until all memory portions of the memory page have been marked as free or allocated in the meta-data of the active page table, and viii) repeating processes iii)-vii) for each remaining memory page in the plurality of memory pages in the active page table, until all memory portions of the memory pages in the active page table have been marked as freed or allocated in the meta-data of the active page table.

FIG. 1 is a flow diagram of a method 100 for user mode memory allocation of a memory portion of a non-volatile main memory in a computing device to an object of a computer program according to a first embodiment of the present invention.

In block 102, a user mode memory allocator of the computing device receives a request for non-volatile memory allocation of an object from a program executing on the computing device. The request comprises a requested memory size and registration data from the program. The registration data may be registration data for a page, which comprises at least one memory portion with a size suitable for allocation to the object.

The registration data may comprise a name of a recovery function stored in the non-volatile memory, a pointer to the recovery function, or any other identifier for identifying or invoking the recovery function. It may also comprise additional information to be passed to the recovery function, typically in a form of a pointer to the information. The memory allocator may store the registration data for a page in the metadata for the page in the non-volatile main memory, and use the registration data to invoke the recovery function for recovering metadata of the page in the event of a power failure.

The recovery function may be specific to the program. An example of the program-specific recovery function is a function for recovery of linked list nodes. In this example, if the object being recovered is reachable from the linked list, then it should be marked as allocated in allocator metadata. If it is not reachable, it should be marked as free.

In block 104, the memory allocator finds, an address of an available memory portion in a plurality of memory portions of a page of the non-volatile memory. The available memory portion is a memory portion available and has a size suitable for allocation to the object.

In block 106, the memory allocator searches an active page table in the non-volatile main memory to look for the page. The active page table is a table of memory pages of the non-volatile memory that need allocator metadata recovery in case of a power failure. As explained above, recent updates to the metadata of pages of the active page table may be stored in a volatile memory temporarily, such as a CPU cache, and may be lost in the event of a power failure.

If the page is not found in the active page table, the method proceeds to block 108, in which the memory allocator inserts the page into the active page table in the non-volatile main memory. Then, in block 110, the memory allocator waits for a memory write for inserting the page into the active page table to complete. Waiting for the memory write to complete means the memory allocator does not carry out any further steps until the memory write is completed. Then the method proceeds to block 112.

Alternatively, if the page is found in the active page table, the method proceeds from block 106 to block 112 straightaway. In this case, the allocation of a memory portion, which is already in the active page table, does not require writes to the main memory, and avoids latencies associated with the writes to the main memory.

In block 112, the memory allocator then issues a write to the non-volatile main memory to mark the memory portion as being allocated to the object in the page in the main memory. The write comprises temporarily storing an update to the metadata of the page in a volatile memory, such as a cache, to indicate the object as being allocated with a memory portion, before writing the update from the volatile memory to the non-volatile memory. Then the update to the metadata stored in the cache for the page is used to update the metadata stored in the non-volatile memory for the page. However, in this block, the memory allocator does not need to wait for the write to complete, i.e. does not need to wait for the update to the metadata stored in the cache to reach the non-volatile memory, before proceeding to the next block.

In block 116, the allocator returns the memory address of the memory portion allocated to the object back to the program.

According to the above user mode memory allocation method, allocation requires at most one wait for a memory write (block 110). The wait is not required frequently, as typically memory portions to be allocated are already in the active page table.

Figure 2:
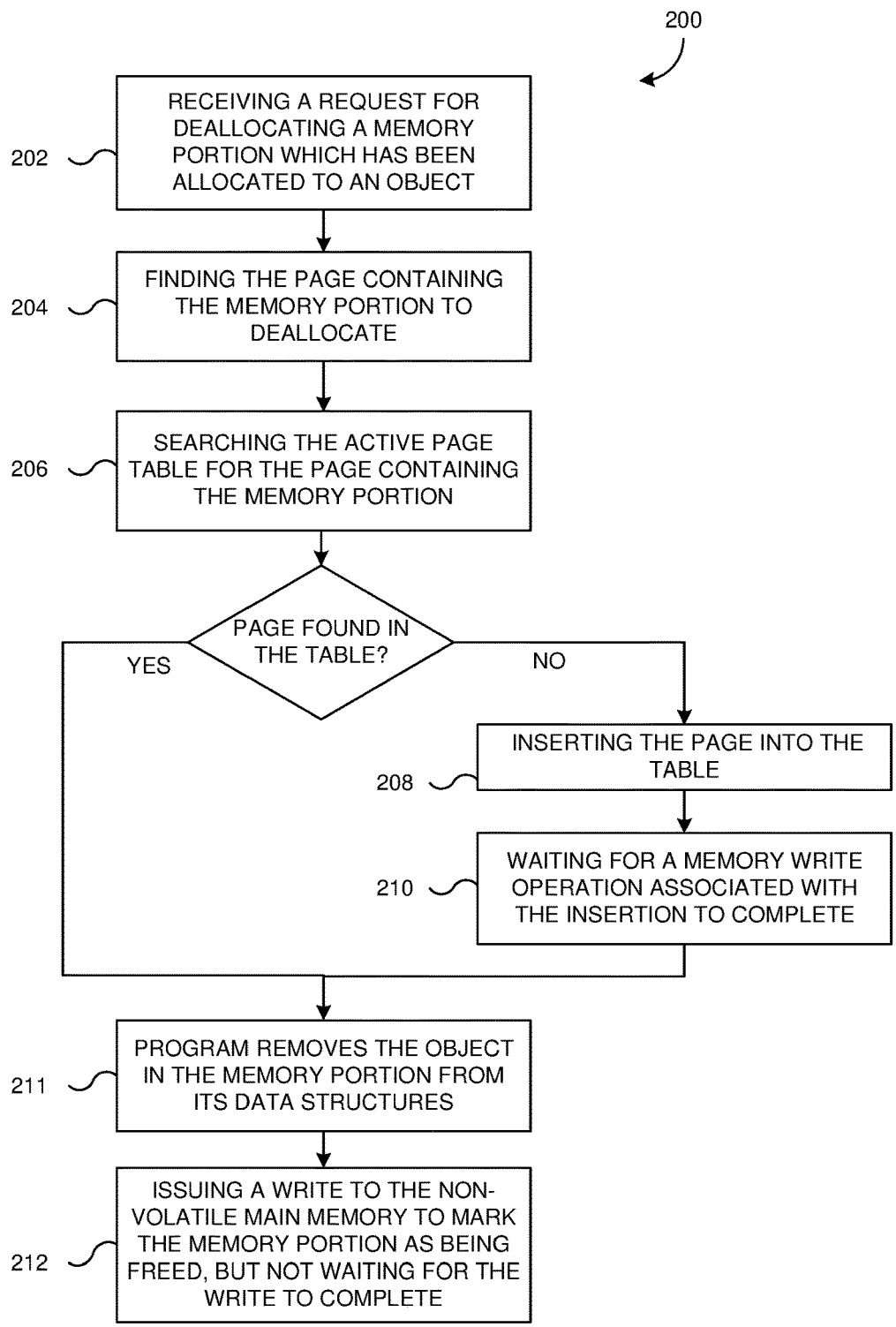
FIG. 2 is a flow diagram of a method for deallocating a memory portion of a non-volatile main memory in a computing device according to the first embodiment.

FIG. 2 is a flow diagram of a method 200 for deallocating a memory portion of a non-volatile main memory in a computing device according to the first embodiment of the present invention.

In block 202, the memory allocator receives, from a program executing on the computing device, a request for deallocating a memory portion which has been allocated to an object. In block 204, the memory allocator finds the memory page containing the memory portion to deallocate. In block 206, the memory allocator searches the active page table in the non-volatile main memory for the page which contains the memory portion to deallocate.

If the page is not found in the active page table, the method proceeds to block 208, in which the allocator inserts the page into the active page table in the non-volatile main memory. Then, in block 210, the memory allocator waits for a memory write for inserting the page into the active page table to complete.

Then in block 211 the program removes the object in the memory portion from its data structures.

Then in block 212, the memory allocator issues a write to the non-volatile main memory to mark the memory portion as free. The write comprises temporarily storing an update to the metadata of the page in a volatile memory, such as a cache, to indicate the object as being allocated with a memory portion, before writing the update from the volatile memory to the non-volatile memory. Then the update to the metadata stored in the cache for the page is used to update the metadata stored in the non-volatile memory for the page. However, in this block, the memory allocator does not need to wait for the write to complete, i.e. does not need to wait for the update to the metadata stored in the cache to reach the non-volatile memory, before proceeding to the next block. Alternatively, if the page is found in the active page table immediately after block 206, the method proceeds from block 206 to block 212 straightaway.

According to the memory deallocation method 200, deallocation requires at most one wait for a memory write (block 210). In many cases the page containing the memory portion to be freed will be in the active page table due to program access patterns, such that the deallocation method 200 does not require any wait for memory writes. For instance, allocating a lot of data at the beginning of a computation and then deallocating it at the end of the computation would result in having the page in the active page table most of the time.

The memory allocator does not unlink an object, and the application program unlinks the object just before requesting it to be freed. This is a more modular approach than the one used by conventional non-volatile memory allocators.

Figure 3:
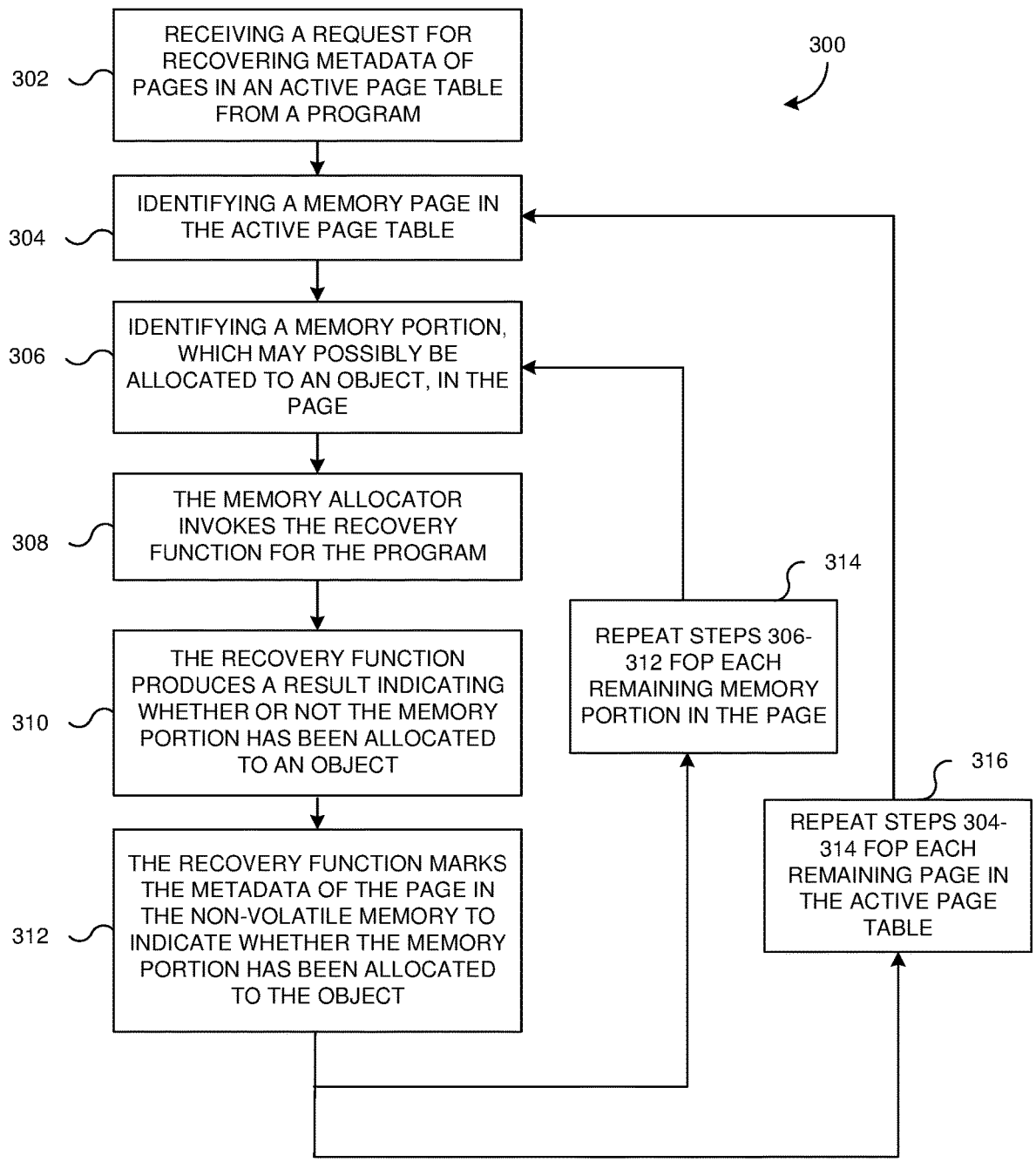
FIG. 3 is a flow diagram of a method for recovering metadata of an active page table in a computing device according to the first embodiment.

FIG. 3 is a flow diagram of a method 300 for recovering metadata of pages in an active page table in a computing device according to the first embodiment of the present invention. The metadata to be recovered was previously stored in a volatile memory and has not been stored the non-volatile memory due to events such as a power failure.

In block 302, the memory allocator receives a request for recovering metadata of pages in an active page table from a program executing on the computing device. Such a request may be received after a reboot of the computing device following a power failure.

In block 304, the memory allocator identifies a memory page in the active page table. In block 306, the memory allocator identifies a memory portion, which may possibly be allocated to an object, in the memory page. In block 308, the memory allocator accesses the registration data stored in the non-volatile main memory to invoke the recovery function for the program. The memory allocator invokes the recovery function for the page and passes the registration data for the page and the address of the memory portion to the recovery function. The registration data for a page is typically a pointer to a root of the data structure for the page, e.g. head of the linked list for the page. Allocations and deallocation of nodes in the linked list may pass the address of the head as the registration data for the page to the recovery function of the program. The registration data is stored in the full page table in the non-volatile memory. In block 310, the recovery function returns a result indicating whether or not the memory portion has been allocated to an object based on the received registration data for the page.

In block 312, the recovery function then updates data in the non-volatile memory to indicate whether the memory portion has been allocated to the object, flushes the update from the cache to the non-volatile memory to update the metadata of the page in the non-volatile memory, and waits for the write to reach the non-volatile memory.

In block 314, blocks 306-312 are repeated for each remaining memory portion, which may possibly be allocated to an object, of the memory page, until all possible memory portions have been marked as free or allocated in the meta-data of the page. Then in block 316, blocks 304-314 are repeated for each remaining page in the active page table, until all pages in the active page table have been processed.

At the end of the method 300, the page metadata of the pages in the active page table is recovered in the non-volatile memory to indicate which objects have been allocated with a portion of the non-volatile main memory and which objects have not been allocated with a memory portion. The active page table may be cleared at this point.

The recovery function uses the registration data and program logic to recover metadata for the active pages stored in the non-volatile memory. The process effectively reconciles what is in the allocator metadata and what is in the program's data structures.

In one example, the program uses a linked list as its data structure. A linked list consists of nodes. Each node has a pointer (link) to the next node in the list. A pointer can be a memory address. The head of the linked list is a pointer to the first node in the list, or a null pointer if the list is empty. The head of the list is stored at a statically known address H.

When a program allocates a node for this linked list, it requests a memory portion with a size equal to a size required by the node and it provides address of the list recovery function and the address of the list. The registration data for the list may contain the address H of the head. A different list can use the same recovery function, but it provides a different address H' for its head.

In this example, the list consists of four nodes, which are linked as follows:

H→N1→N2→N3→N4

The program allocates a new node N5 from the allocator. This puts page P5, to which the nodes in the linked list are allocated, in the active page table. The address of the recovery function and the registration data (which contains the address of head H) are in the full page table in the non-volatile memory. The program then inserts the new node N5 into the linked list between N2 and N3 and the list now looks like this:

H→N1→N2→N5→N3→N4

Assume that the linked list algorithm makes it possible not to flush any of the updates from the CPU cache to the non-volatile memory. Next the program allocates node N6 from the same page P5 and puts it at the end of the list:

H→N1→N2→N5→N3→N4→N6

Again there is no flushing here from the program. The updates to nodes N2 and N4 (updates to their links) are in CPU cache. The updates to the page metadata are also in the cache. Depending on what happens in the system, some subset of these updates might be flushed to non-volatile memory. CPU cache evictions happen, for instance, when the CPU needs to put a new piece of data into the cache but the cache is full.

Then if there is a power failure, after power comes back the memory allocator invokes the recovery function. It invokes the linked list recovery function with the head H (as stored in the full page table) for every memory portion in the page P5, as page P5 is in the active table. The linked list recovery function follows the links from the head. If it finds the address of a memory portion for a node in the list, it returns true. Otherwise, it returns false.

In this example, depending on what cache evictions happened before the power failure, the linked list may be in one of the four states after power comes back:
1) H→N1→N2→N3→N4
2) H→N1→N2→N5→N3→N4
3) H→N1→N2→N5→N3→N4→N6
4) H→N1→N2→N3→N4→N6

Independently, metadata for page P5 may have portions of N5 and N6 in one of the four states, which respectively correspond to states 1)-4) above:
a) N5: free, N6: free
b) N5: alloc, N6: free
c) N5: alloc, N6: alloc
d) N5: free, N6: alloc The linked list state indicates the how various nodes/objects are linked. It also indicates that the nodes/objects currently in the list should be allocated with a memory portion and the nodes/objects removed from the list should have their respective memory portions freed. The allocator metadata state indicates whether each node/object has been allocated with a memory portion or freed. The recovery function brings the allocator metadata state to match the corresponding program linked list state, to ensure that there are no memory leaks or corruptions. For instance, if the allocator is in state a) and the list is in state 4), the recovery procedure correctly marks N6 as allocated to avoid memory corruption. In other words, the recovery procedure changes allocator metadata state from a) to d), which corresponds to linked list state 4), to avoid memory corruption. As another example, if the linked list is in state 2) and allocator in state c), it correctly marks N6 as freed as per state b) to avoid a memory leak. The Skilled Person would appreciate that the above is merely a non-limiting example of a procedure carried out by the recovery function, and various modifications are made to this procedure without departing from the scope of the subject matter described herein.

The program may register the recovery function for each object type at its start. It is stored in non-volatile memory to allow invoking after a power failure. The function may be stored in a form that does not depend on address layout after recovery. An alternative approach is to have the program register the type and the recovery function before the first allocation of that type. This mapping between function and type can be stored in the recovery function table in the non-volatile memory. The recovery procedure invokes the right function for the type during recovery.

Instead of invoking a function per object, the recovery procedure may group all objects of the same type and invoke the recovery function for the whole group. This allows more efficient memory recovery in some cases. For instance, in the example of recovery of linked list nodes described above, the program could store all the objects that need recovery in a temporary hash table, traverse the linked list once marking all the objects reachable in the list in the hash table. When the traversal is finished, all objects marked reachable in the table are marked as allocated in the allocator metadata and the remaining objects are marked free.

Active page table are preferably kept as small as possible to reduce time for recovery. When the memory allocator attempts to add a page to the active page table and finds the active page table full, it may remove some pages from the table to make room for the new entry. To do this, it may wait for all memory writes to reach the non-volatile memory. Then it can mark some entries in the table free and write the updates to the active page table into allocator metadata in the non-volatile memory. It does not have to wait for the write to complete. This may happen whenever a page is added to the active page table on memory allocations and/or deallocations.

In a second embodiment, a memory allocator is integrated with an epoch-based memory reclamation for concurrent program threads. Epoch-based memory reclamation is based on the principle that if an object is unlinked and freed by a first thread, then no references to the object should be held after the operations in other threads, which are concurrent with the operation for unlinking and freeing the object in the first thread, have finished.

In the second embodiment, each of a plurality of concurrently executing threads is provided with a local counter for keeping track of the operation of the respective thread. The counter for a thread is incremented when the thread starts an operation and when the thread completes the operation. Therefore, an odd counter number for the thread may indicate that the thread is executing an operation, and an even counter number for the thread may indicate that the thread has completed the operation. The vector of all threads' counters is called an "epoch". Epoch A is greater than epoch B when each of A's counters has a value that is greater than the value of a corresponding counter in B if the value of the corresponding counter in B is odd, and equal or greater than the value of a corresponding counter in B if the value of the corresponding counter in B is even. An object can be freed when the current epoch is greater than the epoch in which it was unlinked. A power failure leads to expiry of all epochs.

To optimize deallocation, multiple objects can be collected and freed together. The set of deleted objects which are freed together are referred to as a "generation". The generation's epoch is the epoch at which the last object in the generation is deleted. When the current epoch is greater than the generation's epoch, the generation can be freed, which means the memory portions allocated to all objects in the generation can be deallocated.

When integrated with epoch-based memory reclamation, each of the plurality of concurrently executing threads maintains its own active page table in the non-volatile memory. In addition, it maintains metadata of each active page in the volatile memory. The metadata of each active page for each thread comprises 1) the greatest epoch at which the thread has unlinked an object from the page, which is named the "last freed epoch" and 2) the greatest epoch at which the thread has allocated memory from the page, which is named the "last allocated epoch".

Figure 4:
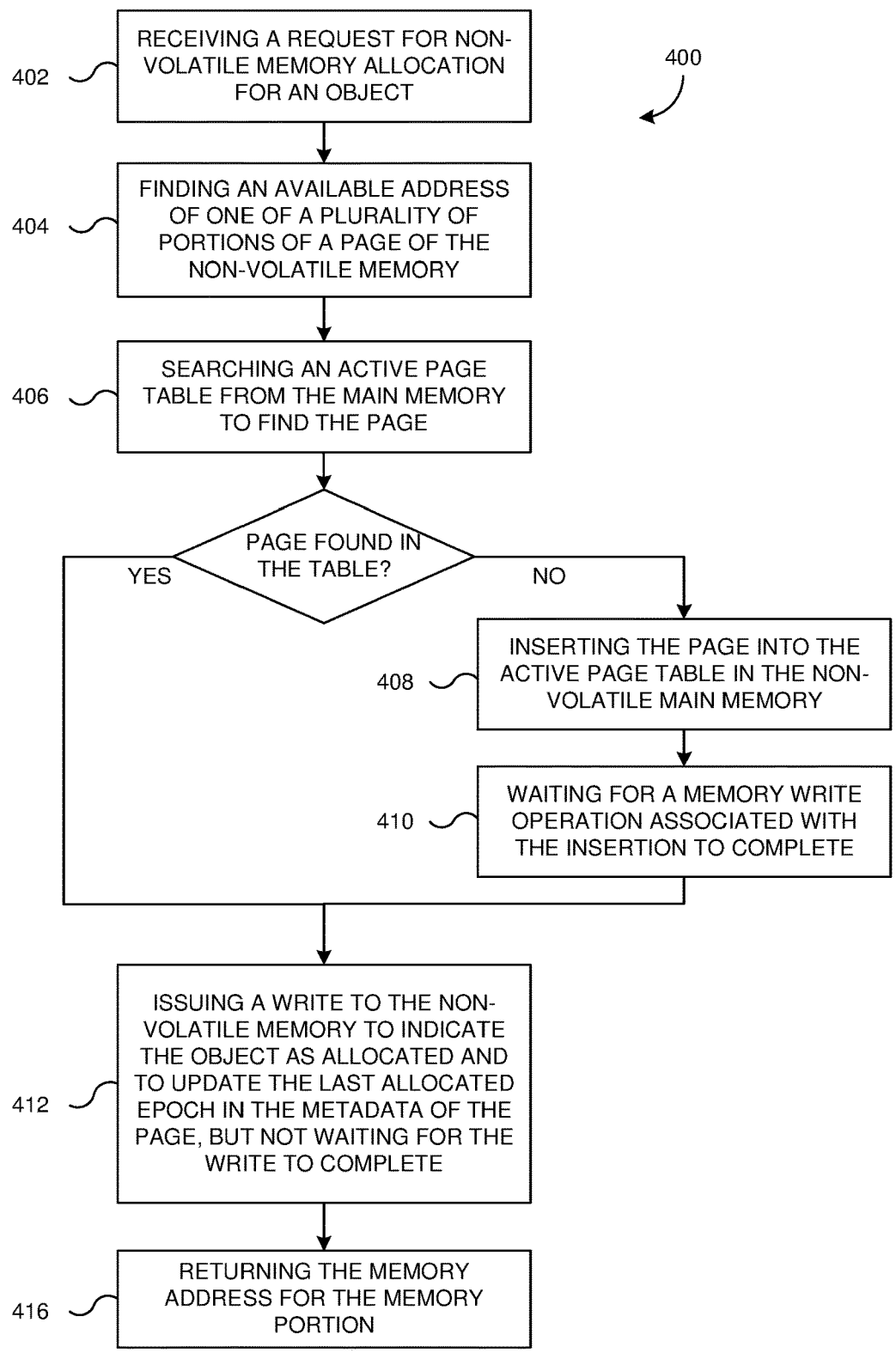
FIG. 4 is a flow diagram of a method for allocating a memory portion of a non-volatile main memory to an object during concurrent execution of a plurality of program threads according to a second embodiment.

FIG. 4 is a flow diagram of a method 400 for allocating a memory portion of a non-volatile main memory to an object during concurrent execution of a plurality of program threads according to the second embodiment of the present invention.

In block 402, a memory allocator of the computing device receives a request for non-volatile memory allocation of an object from one of a plurality of program threads concurrently executing on the computing device. The request comprises a requested memory size and registration data as explained with reference to FIG. 1.

Blocks 404-410 are substantially the same as blocks 104-110 of method 100 and therefore their details are omitted for conciseness. However, block 412 differs from block 112 in that block 412 additionally requires the memory allocator to update the last allocated epoch in the metadata of the page in the non-volatile memory.

In block 412, the memory allocator issues a write to the non-volatile main memory to mark the memory portion as being allocated to the object in the active page table for the program thread in the main memory and to update the last allocated epoch in the metadata of the page in the non-volatile memory. Similar to block 112, in block 412, the write comprises temporarily storing an update to the metadata of the page in a volatile memory, such as a cache, to indicate the object as being allocated with a memory portion and to update the last allocated epoch in the metadata of the page, before writing the update from the volatile memory to the non-volatile memory. However, in this block, the memory allocator does not need to wait for the write to complete, i.e. does not need to wait for the update to the metadata stored in the cache to reach the non-volatile memory, before proceeding further.

In block 416, the allocator returns the memory address for the memory portion allocated to the object back to the program thread.

Figure 5:
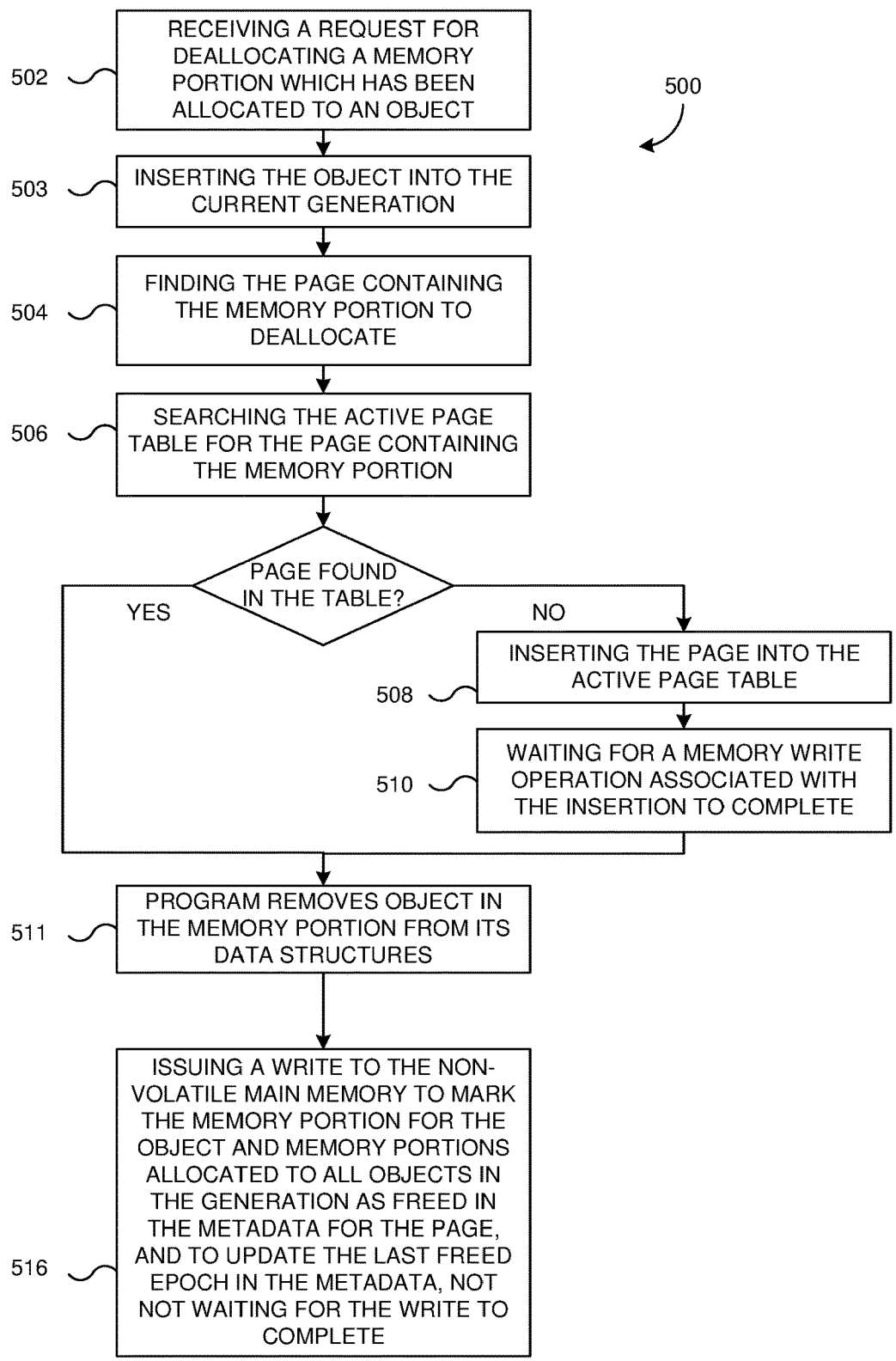
FIG. 5 is a flow diagram of a method for deallocating a memory portion, which has been allocated to an object, during concurrent execution of a plurality of program threads according to the second embodiment.

FIG. 5 is a flow diagram of a method 500 for deallocating a memory portion allocated to an object in a non-volatile main memory during concurrent execution of a plurality of program threads according to the second embodiment of the present invention.

In block 502, the memory allocator receives, from one of a plurality of program threads concurrently executing on the computing device, a request for deallocating a memory portion of a non-volatile main memory which has been allocated to an object. In block 503, the memory allocator inserts the object in the current generation of objects which are to be freed together.

Blocks 504-510 are substantially the same as blocks 204-210 of method 200 and therefore their details are omitted for conciseness. In block 511 the program removes the object from its data structures. Block 512 differs from block 212 in that block 512 additionally requires the memory allocator to free memory portions allocated to all objects in the generation together, and requires the memory allocator to update the last freed epoch in the metadata of the page in the non-volatile memory.

More specifically, in block 512, the memory allocator issues a write to the non-volatile memory to mark the memory portion for the object and memory portions allocated to all objects in the generation as freed in the metadata for the page, and update the last freed epoch in the metadata. Similar to block 212, in block 512, the write comprises temporarily storing an update to the metadata of the page in a volatile memory, such as a cache, before writing the update from the volatile memory to the non-volatile memory. In this block, the memory allocator does not need to wait for the write to complete, i.e. does not need to wait for the update to the metadata stored in the cache to reach the non-volatile memory, before proceeding further.

When removing pages from the active table, the allocator is allowed to remove pages for which the current epoch is greater than both last allocated and last freed epoch stored in volatile metadata. A page can be removed from the active page table after all operations that were in progress in epochs when objects were allocated and deallocated from the page are completed. This happens when the epoch mechanism determines that all operations have been performed, or when there is a power outage.

Figure 6:
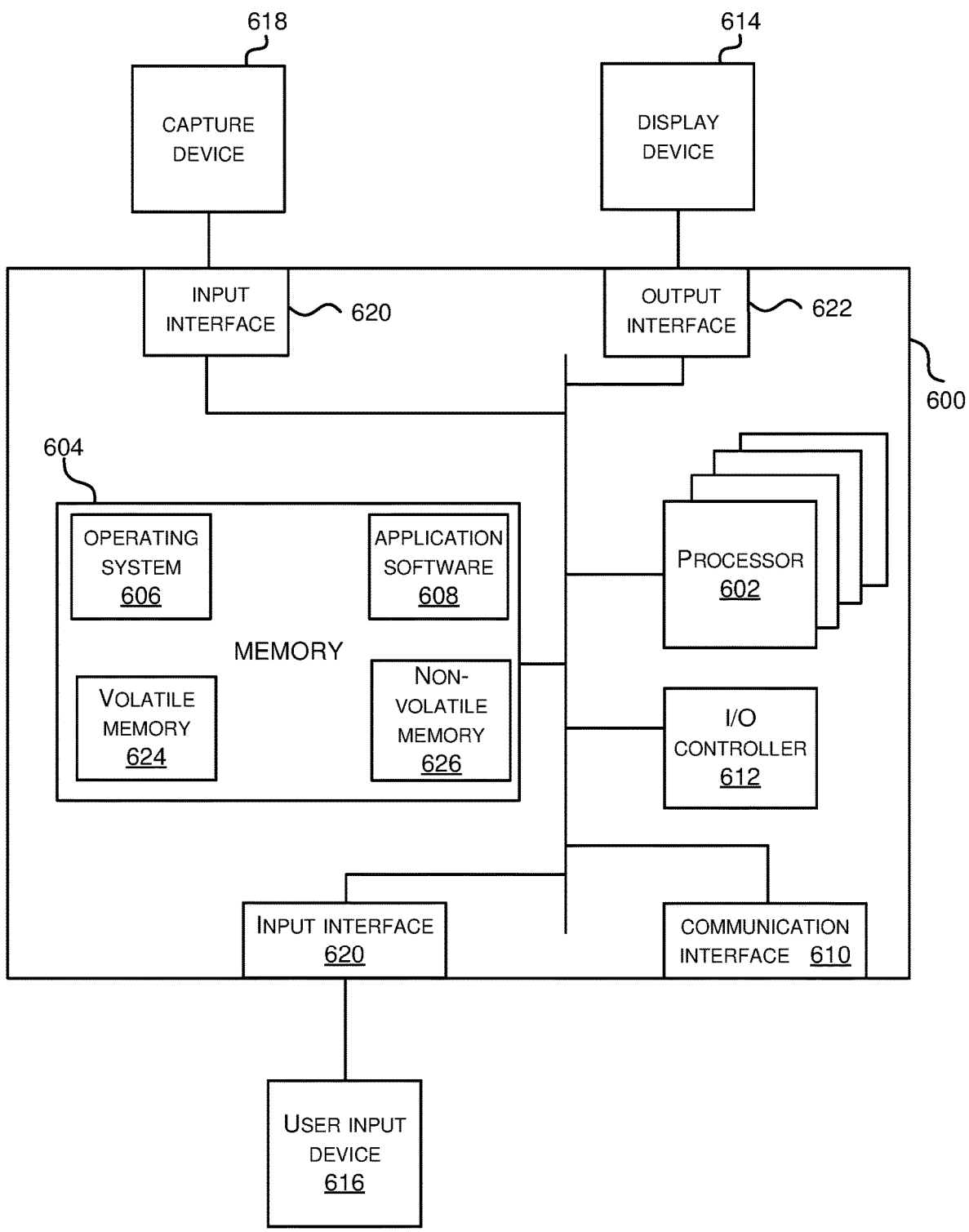
FIG. 6 illustrates an exemplary computing-based device in which various embodiments are implemented.

FIG. 6 illustrates various components of an exemplary computing-based device 600 which are implemented as any form of a computing and/or electronic device, and in which the various embodiments described above are implemented.

Computing-based device 600 comprises one or more processors 602 which are microprocessors, controllers or any other suitable type of processors for processing computer executable instructions to control the operation of the device in order to perform the methods according to the various embodiments. In some examples, for example where a system on a chip architecture is used, the processors 600 include one or more fixed function blocks (also referred to as accelerators) which implement a part of the methods of the various embodiments in hardware (rather than software or firmware). Platform software comprising an operating system 606 or any other suitable platform software is provided at the computing-based device to enable application software 608 to be executed on the device.

The computer executable instructions are provided using any computer-readable media that is accessible by computing based device 600. Computer-readable media includes, for example, computer storage media such as memory 604 and communications media. Computer storage media, such as memory 604, includes volatile (624) and non-volatile (626), removable and non-removable media implemented in any method or technology for storage of information such as computer readable instructions, data structures, program modules or the like. Computer storage media includes, but is not limited to, random access memory (RAM), read only memory (ROM), erasable programmable read only memory (EPROM), electronic erasable programmable read only memory (EEPROM), flash memory or other memory technology, compact disc read only memory (CD-ROM), digital versatile disks (DVD) or other optical storage, magnetic cassettes, magnetic tape, magnetic disk storage or other magnetic storage devices, or any other non-transmission medium that is used to store information for access by a computing device. In contrast, communication media embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media (memory 604) is shown within the computing-based device 600 it will be appreciated that the storage is, in some examples, distributed or located remotely and accessed via a network or other communication link (e.g. using communication interface 610).

The computing-based device 600 also comprises an input/output controller 612 arranged to output display information via an output interface 622 to a display device 614 which may be separate from or integral to the computing-based device 600. The display information may provide a graphical user interface. The input/output controller 612 is also arranged to receive and process input from one or more devices, such as a user input device 616 (e.g. a mouse, keyboard, camera, microphone or other sensor). In some examples the user input device 616 detects voice input, user gestures or other user actions and provides a natural user interface (NUI). In an embodiment the display device 614 also acts as the user input device 616 if it is a touch sensitive display device. The input/output controller 612 outputs data to devices other than the display device in some examples, e.g. a locally connected printing device (not shown in FIG. 6).

Any of the input/output controller 612, display device 614 and the user input device 616 may comprise NUI technology which enables a user to interact with the computing-based device in a natural manner, free from artificial constraints imposed by input devices such as mice, keyboards, remote controls and the like. Examples of NUI technology that are provided in some examples include but are not limited to those relying on voice and/or speech recognition, touch and/or stylus recognition (touch sensitive displays), gesture recognition both on screen and adjacent to the screen, air gestures, head and eye tracking, voice and speech, vision, touch, gestures, and machine intelligence. Other examples of NUI technology that are used in some examples include intention and goal understanding systems, motion gesture detection systems using depth cameras (such as stereoscopic camera systems, infrared camera systems, red green blue (rgb) camera systems and combinations of these), motion gesture detection using accelerometers/gyroscopes, facial recognition, three dimensional (3D) displays, head, eye and gaze tracking, immersive augmented reality and virtual reality systems and technologies for sensing brain activity using electric field sensing electrodes (electro encephalogram (EEG) and related methods).

Alternatively, or in addition, the functionality described herein is performed, at least in part, by one or more hardware logic components. For example, and without limitation, illustrative types of hardware logic components that are optionally used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

Alternatively or in addition to the other examples described herein, examples include any combination of the following:

A method for allocating memory in a computing device having a non-volatile main memory, the method comprising:
receiving, by a memory allocator, a request for non-volatile memory allocation of an object from a program executing on the computing device, the request comprising a requested memory size and registration data from the program;
finding an available address of one of a plurality of portions of a page of the non-volatile memory;
searching an active page table in the non-volatile main memory to find the page and if the page is not found in the active page table:
inserting the page into the active page table; and
waiting for a memory write for inserting the page into the active page table to complete.

The method described above, further comprising: issuing a write to the non-volatile main memory to mark the memory portion as being allocated to the object, but not waiting for the write to complete.

The method described above, wherein said issuing a write comprises temporarily storing an update to the metadata of the page in a volatile memory before writing the update into the non-volatile memory.

The method described above, further comprising: returning, by the memory allocator to the program, a memory address of the memory portion allocated to the object.

The method described above, further comprising: storing the registration data in a log in the non-volatile main memory.

The method described above, wherein the registration data comprises at least one of a name of a recovery function stored in the non-volatile main memory, a pointer to the recovery function, and an identifier for invoking the recovery function.

The method of described above, wherein said receiving a request for non-volatile memory allocation of an object comprises receiving the request from one of a plurality of program threads currently executing on the computing device, wherein the metadata of the page comprises a last allocated epoch of the plurality of concurrently executing program threads, and wherein the method further comprises updating the last allocated epoch in metadata of the page.

The method described above, wherein information indicating an object type is included in metadata of each of the plurality of pages and/or included in the active page table.

The method described above, wherein the epoch for the plurality of program threads is a vector of a plurality of counters, each counter being associated with a respective program thread.

A method for deallocating memory in a computing device having a non-volatile main memory, the method comprising:
receiving, from a program executing at the computing device, a request for deallocating a portion of the non-volatile main memory allocated to an object;
finding a page containing the memory portion;
searching an active page table in the non-volatile main memory to find the page, and if the page is not found in the active page table: inserting the page into the active page table; and waiting for a memory write for inserting the page into the active page table to complete.

The method described above, further comprising: issuing a write to the non-volatile main memory to mark the memory portion as being deallocated in the page, but not waiting for the write to complete, wherein said issuing a write comprises temporarily storing an update to the metadata of the page in a volatile memory before writing the update to the non-volatile memory.

The method described above, wherein said receiving a request for deallocating a portion of the non-volatile memory comprises receiving the request from one of a plurality of program threads currently executing on the computing device, wherein the metadata of the page comprises a last freed epoch of the plurality of concurrently executing programs, and wherein the method further comprises: inserting the object into a generation of objects which are to be freed together, updating the last freed epoch in the metadata of the page, freeing memory portions allocated to all objects in the generation, and issuing a write to the non-volatile main memory to mark the memory portions allocated to the objects in the generation as being freed, but not waiting for the write to complete.

A method for data recovery in a computing device having a non-volatile main memory and a volatile memory, the method comprising:
i) receiving, from a program, a request for recovering metadata of a plurality of pages an active page table,
ii) identifying a memory page in the plurality of memory pages in the active page table,
iii) identifying a memory portion in a plurality of memory portions in the memory page,
iv) accessing registration data stored in the non-volatile main memory to invoke a recovery function for the program,
v) producing, by the recovery function, a result indicating whether the memory portion has been allocated to an object or has been freed, and
vi) marking, by the recovery function, metadata of the page in the non-volatile memory to indicate whether the memory portion has been allocated to the object or has been freed using the result.

The method described above, further comprising:
vii) repeating processes iv)-vi) for each remaining memory portion in the plurality of memory portions of the memory page, until all memory portions of the memory page have been marked as free or allocated in the metadata of the page, and
viii) repeating processes iii)-vii) for each remaining memory page in the plurality of memory pages in the active page table, until all memory portions of the memory pages in the active page table have been marked as freed or allocated in the metadata of the pages.

The method described above, wherein said process iv) for accessing registration data to invoke a recovery function comprises invoking the recovery function by passing an address of the memory portion to the recovery function, and wherein the result is provided by the recovery function using the address of the memory portion.

The method described above, further comprising
storing a recovery function table in the non-volatile memory, the recovery function table comprising a mapping between functions and object types, and
identifying the recovery function to be invoked based on an object type and the recovery function table.

The method described above, further comprising grouping objects of the same type and invoking the recovery function for the group of objects of the same type.

A computing device, comprising
at least one processor, and
at least one volatile memory and at least one non-volatile memory configured to cause the processor to perform the methods described above.

One or more device-readable media with device-executable instructions that, when executed by a computing system, direct the computing system to perform the methods described above.

The term 'computer' or 'computing device' is used herein to refer to any device with processing capability such that it executes instructions. Those skilled in the art will realize that such processing capabilities are incorporated into many different devices and therefore the terms 'computer' and 'computing device' each include personal computers (PCs), servers, mobile telephones (including smart phones), tablet computers, set-top boxes, media players, games consoles, personal digital assistants, wearable computers, and many other devices.

The methods described herein are performed, in some examples, by software in machine readable form on a tangible storage medium e.g. in the form of a computer program comprising computer program code means adapted to perform all the operations of one or more of the methods described herein when the program is run on a computer and where the computer program may be embodied on a computer readable medium. The software is suitable for execution on a parallel processor or a serial processor such that the method operations may be carried out in any suitable order, or simultaneously.

This acknowledges that software is a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions are optionally distributed across a network. For example, a remote computer is able to store an example of the process described as software. A local or terminal computer is able to access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a digital signal processor (DSP), programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The operations of the methods described herein may be carried out in any suitable order, or simultaneously where appropriate. Additionally, individual blocks may be deleted from any of the methods without departing from the scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the scope of this specification.

The configurations described above enable various methods for providing user input to a computer system. Some such methods are now described, by way of example, with continued reference to the above configurations. It will be understood, however, that the methods here described, and others within the scope of this disclosure, may be enabled by different configurations as well. The methods herein, which involve the observation of people in their daily lives, may and should be enacted with utmost respect for personal privacy. Accordingly, the methods presented herein are fully compatible with opt-in participation of the persons being observed. In embodiments where personal data is collected on a local system and transmitted to a remote system for processing, that data can be anonymized in a known manner. In other embodiments, personal data may be confined to a local system, and only non-personal, summary data transmitted to a remote system.

The invention claimed is:

1. A method for data recovery in a computing device having a non-volatile main memory and a volatile memory, the method comprising:
   i) receiving, from a program, a request for recovering metadata of a plurality of pages in an active page table,
   ii) identifying a memory page in the plurality of memory pages in the active page table,
   iii) identifying a memory portion in a plurality of memory portions in the memory page,
   iv) accessing registration data stored in the non-volatile main memory to invoke a recovery function for the program,
   v) producing, by the recovery function, a result indicating whether the memory portion has been allocated to an object or has been freed, and vi) marking, by the recovery function, metadata of the page in the non-volatile memory to indicate whether the memory portion has been allocated to the object or has been freed using the result.

2. The method of claim 1, further comprising:
vii) repeating processes iv)-vi) for each remaining memory portion in the plurality of memory portions of the memory page, until all memory portions of the memory page have been marked as free or allocated in the metadata of the page, and
viii) repeating processes iii)-vii) for each remaining memory page in the plurality of memory pages in the active page table, until all memory portions of the memory pages in the active page table have been marked as freed or allocated in the metadata of the pages.

3. The method of claim 1, wherein said process iv) for accessing registration data to invoke a recovery function comprises invoking the recovery function by passing an address of the memory portion to the recovery function, and wherein the result is provided by the recovery function using the address of the memory portion.

4. The method of claim 1, further comprising:
storing a recovery function table in the non-volatile memory, the recovery function table comprising a mapping between functions and object types, and
identifying the recovery function to be invoked based on an object type and the recovery function table.

5. The method of claim 1, further comprising:
grouping objects of the same type and invoking the recovery function for the group of objects of the same type.

6. The method of claim 1, further comprising:
prior to process i), registering, by the program, the recovery function for each object type, the registering initiated by the program when the program starts;
the registering comprising storing the recovery function in the non-volatile main memory.

7. The method of claim 1, wherein the registration data comprises at least one of a name of a recovery function stored in the non-volatile main memory, a pointer to the recovery function, and an identifier for invoking the recovery function.

8. One or more device-readable media having device-executable instructions that, upon execution by a processor, cause the processor to at least:
i) receive, from a program, a request for recovering metadata of a plurality of pages in an active page table,
ii) identify a memory page in the plurality of memory pages in the active page table,
iii) identify a memory portion in a plurality of memory portions in the memory page,
iv) access registration data stored in the non-volatile main memory to invoke a recovery function for the program,
v) produce, by the recovery function, a result indicating whether the memory portion has been allocated to an object or has been freed, and
vi) mark, by the recovery function, metadata of the page in the non-volatile memory to indicate whether the memory portion has been allocated to the object or has been freed using the result.

9. The one or more device-readable media of claim 8, further comprising:
vii) repeating processes iv)-vi) for each remaining memory portion in the plurality of memory portions of the memory page, until all memory portions of the memory page have been marked as free or allocated in the metadata of the page, and
viii) repeating processes iii)-vii) for each remaining memory page in the plurality of memory pages in the active page table, until all memory portions of the memory pages in the active page table have been marked as freed or allocated in the metadata of the pages.

10. The one or more device-readable media of claim 8, wherein said process iv) for accessing registration data to invoke a recovery function comprises invoking the recovery function by passing an address of the memory portion to the recovery function, and wherein the result is provided by the recovery function using the address of the memory portion.

11. The one or more device-readable media of claim 8, further comprising:
storing a recovery function table in the non-volatile memory, the recovery function table comprising a mapping between functions and object types, and
identifying the recovery function to be invoked based on an object type and the recovery function table.

12. The one or more device-readable media of claim 8, further comprising:
grouping objects of the same type and invoking the recovery function for the group of objects of the same type.

13. The one or more device-readable media of claim 8, further comprising:
prior to process i), registering, by the program, the recovery function for each object type, the registering initiated by the program when the program starts;
the registering comprising storing the recovery function in the non-volatile main memory.

14. The one or more device-readable media of claim 8, wherein the registration data comprises at least one of a name of a recovery function stored in the non-volatile main memory, a pointer to the recovery function, and an identifier for invoking the recovery function.

15. A system comprising:
an at least one processor; and
memory coupled with the at least one processor and having instructions stored therein which, when executed by the at least one processor, cause the system to:
i) receive, from a program, a request for recovering metadata of a plurality of pages in an active page table,
ii) identify a memory page in the plurality of memory pages in the active page table,
iii) identify a memory portion in a plurality of memory portions in the memory page,
iv) access registration data stored in the non-volatile main memory to invoke a recovery function for the program,
v) produce, by the recovery function, a result indicating whether the memory portion has been allocated to an object or has been freed, and
vi) mark, by the recovery function, metadata of the page in the non-volatile memory to indicate whether the memory portion has been allocated to the object or has been freed using the result.

16. The system of claim 15, wherein the instructions, when executed by the at least one processor, further cause the system to:
vii) repeat processes iv)-vi) for each remaining memory portion in the plurality of memory portions of the memory page, until all memory portions of the memory page have been marked as free or allocated in the metadata of the page, and viii) repeat processes iii)-vii) for each remaining memory page in the plurality of memory pages in the active page table, until all memory portions of the memory pages in the active page table have been marked as freed or allocated in the metadata of the pages.

17. The system of claim 15, wherein said process iv) for accessing registration data to invoke a recovery function comprises invoking the recovery function by passing an address of the memory portion to the recovery function, and wherein the result is provided by the recovery function using the address of the memory portion.

18. The system of claim 15, wherein the instructions, when executed by the at least one processor, further cause the system to:

store a recovery function table in the non-volatile memory, the recovery function table comprising a mapping between functions and object types, and identify the recovery function to be invoked based on an object type and the recovery function table.

19. The system of claim 15, wherein the instructions, when executed by the at least one processor, further cause the system to:

group objects of the same type and invoke the recovery function for the group of objects of the same type.

20. The system of claim 15, wherein the registration data comprises at least one of a name of a recovery function stored in the non-volatile main memory, a pointer to the recovery function, and an identifier for invoking the recovery function.

\* \* \* \* \*